United States Patent [19]

van Turnhout

[11] E Re. 30,782

[45] Reissued Oct. 27, 1981

[54] METHOD FOR THE MANUFACTURE OF AN ELECTRET FIBROUS FILTER

[75] Inventor: Jan Van Turnhout, Delft, Netherlands

[73] Assignee: Minnesota Mining and Manufacturing Company, Saint Paul, Minn.

[21] Appl. No.: 929,680

[22] Filed: Jul. 31, 1978

Related U.S. Patent Documents

Reissue of:

[64] Patent No.: 3,998,916
Issued: Dec. 21, 1976
Appl. No.: 561,872
Filed: Mar. 25, 1975

[30] Foreign Application Priority Data

Mar. 25, 1974 [NL] Netherlands ..... 7403975

[51] Int. Cl.[3] ..... B29D 27/00

[52] U.S. Cl. ..... 264/22; 264/DIG. 47; 264/DIG. 48

[58] Field of Search ..... 51/296; 264/22, 25, 264/27, DIG. 47, DIG. 48, 210, 293, 289, 146

[56] References Cited

U.S. PATENT DOCUMENTS

| | | | |
|---|---|---|---|
| 3,003,304 | 10/1961 | Rasmussen | 264/22 |
| 3,333,032 | 7/1967 | Dickinson | 264/22 |
| 3,336,174 | 8/1967 | Dyer et al. | 264/DIG. 47 |
| 3,438,504 | 4/1969 | Furman | 264/22 |
| 3,474,611 | 10/1969 | Suzuki et al. | 264/DIG. 47 |
| 3,571,679 | 3/1971 | Turnhout | 317/262 |
| 3,644,605 | 2/1972 | Sessler et al. | 264/22 |
| 3,691,264 | 9/1972 | Asahina | 264/22 |
| 3,880,966 | 4/1975 | Zimmerman | 264/22 |

*Primary Examiner*—Thomas P. Pavelko
*Attorney, Agent, or Firm*—Watson, Cole, Grindle & Watson

[57] ABSTRACT

A method for the manufacture of an electrically charged fibrous filter from a highly molecular non-polar fiber material wherein a [web] *film* of the fiber material is continuously fed and stretched. At least one side of the stretched [web] *film* is homopolarly charged by a plurality of corona charging elements. The charged [web] *film* material is then fibrillated, collected and processed into a filter.

48 Claims, 4 Drawing Figures

METHOD FOR THE MANUFACTURE OF AN ELECTRET FIBROUS FILTER

Matter enclosed in heavy brackets [ ] appears in the original patent but forms no part of this reissue specification; matter printed in italics indicates the additions made by reissue.

BACKGROUND OF THE INVENTION

The invention relates to a method for the manufacture of an electrically charged fibrous filter, whose fibre material consists of a high molecular non-polar substance.

Such a method is known in the art and from this method it appears that charging of fibre material in an electric field to obtain a charged fibrous filter is difficult because of electric breakdown through the pores of the material. Covering the electrodes, between which the forming field strength is applied, with a semi-conducting material, admittedly offers the possibility of bringing the fibre material to a higher charged state, but at the same time has the drawback that this state is reached only after a longer period of time.

It is the object of the invention to provide for a rapid manufacture of highly charged fibre filters.

SUMMARY OF THE INVENTION

According to the invention the method is characterized in that it comprises continuously feeding a film of the high molecular non-polar substance, stretching the film, homopolarly charging the stretched film with the aid of corona elements, fibrillating the stretched charged film, collecting the fibre material and processing the collected fibre material into a filter of the desired shape.

Because the risk of breakdown of charging a solid film material is much less than that of an open fibre material, a charging system known per se, operating much faster and much more effectively, comprising corona elements can be used.

In the preferential embodiment of the invention the film is locally bilaterally charged by means of corona elements that carry on either side of the film equal but opposite potentials. Thereby the film is charged to almost twice as high a voltage as by means of unilateral charging, at one and the same corona voltage.

Charging with the aid of corona elements in turn entails that the film can be fed continuously and be stretched into a well splittable material. This material can be fibrillated in several ways. For this purpose, a needle roller with metal needles running against the film is used with, surprisingly no substantial loss of charge.

Preferably, the fibre material is collected in layers onto a take-up roller and there processed into filter cloth of the thickness and shape desired by taking one or more layers, which are laying one on top of the other, together and at the same time from the roller.

BRIEF DESCRIPTION OF THE DRAWING

The invention will now further be elucidated with reference to the following drawings, wherein.

In the figures like numbers refer to like elements.

FIG. 1 shows film 1, which, either from a storage roller, or direct from an extruder is fed between roller 3 and 4 into a stretching device to make film 1 splittable.

Figure 1:
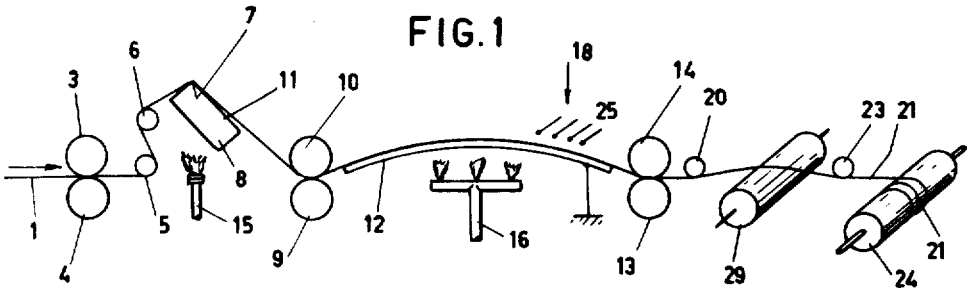
FIG. 1 schematically shows an embodiment of a device in which, for the manufacture of a well splittable charged film, use has been made for the method according to the invention.

In this arrangement the charge is injected into film 1 from above.

The stretching device contains fixed pins 5 and 6, block 8 heated by heater 15, a pair of rollers 9 and 10, arcuate plate 12 heated by heater 16 and a pair of rollers 13 and 14.

A stretching device that contains the above mentioned elements has been described in Netherlands Patent Application 71 13047. In this device stretching takes place in two stages. Therefore, it is very well suitable to fibrillate films that are difficult to split.

In the first stage of stretching, which takes place between pin 6 and pair of rollers 9 and 10, film 1 is drawn over edge 7 of block 8 in such a way that film 1 is subjected to an increase in length ratio of approximately 1 to 4 at the cost of its thickness and hardly at the cost of its width.

In the second stage of stretching, which takes place between a pair of rollers 9 and 10 and a pair of rollers 13 and 14, film 1 is drawn over curved plate 12 in such a way that it is subjected to a further increase in length ratio of approximately 1 to 1.5.

The temperature of block 8 greatly depends on the speed of the film and at high speeds can be chosen close below the melting temperature of film 1.

It is of importance that film 1 does not touch the plane of block 8 that lies in front of edge 7, so as to prevent a premature and a too high heating or film 1. The position of plane 11 of block 8, which plane lies behind edge 7 is also of importance, because it is determinative of the speed at which film 1, coming from edge 7, cools down.

Plate 12 is heated to a temperature that is only a little lower than the melting temperature of the film material and because film 1 for an important part lies against the curved surface, film 1 will here receive the highest temperature in the stretching process.

This has schematically been indicated by a triple flame 16 at plate 12, in contrast with a single flame 15 at block 8.

A charging device 18, consisting of a number of thin tungsten wires 25 across the grounded curved plate 12 and connected with the negative terminal of a voltage source, sprays a negative charge on to the top of film 1 by means of the corona effect. This is implemented preferably where the temperature of film 1 on plate 12 is the highest.

It may be of advantage, however, to place the charging device more towards the beginning of plate 12. In this case film 1 will partially discharge over the further part of the heating plate. In particular the charges that have been embedded in the least stable way, will be lost in the process. In this way the electret film is aged thermally, as a result of which only the charges are left that have been embedded in a very stable way. As a result the remaining charge of the electret will have an exceptionally high persistence at ambient temperature. In fact, the thermal stability of the charge that is left is also increased. Moreover, surprisingly, the stability against moisture is also considerably improved.

The device furthermore shows a means 29 for the fibrillation of film 1.

According to the embodiment film 1 is fibrillated into fibres 21 by guiding it via fixed pin 20 along a needle roller 29. By giving the needle roller 29 a higher peripheral velocity than the moving speed of film 1, this film 1 is fibrillated mainly in longitudinal direction. Fibres 21 thus obtained spread themselves to a high extent because of their electrostatic charges, so that a nicely spread layer of fibres is produced, which is wound upon collecting roller 24. By taking one or more layers, which are lying one on top of the other, from the roller together and at the same time, a filter of the desired shape and thickness can be obtained.

From charge measurements it has been found that when negative charges are injected on the top of film 1 on plate 12, at the bottom positive charges are produced. These charges are a result of ionization of the air enclosed between the film and the bottom plate. Thus positive ions are produced in such a region, which charges are drawn to the bottom of the negatively charged film. So, the positive charge actually is a compensating charge. As a result, it is somewhat less high than the injected negative charge.

This unexpected two-sided charging of film 1 can be of importance for use in fibrous filters, because most aerosol particles that must be captured are electrically charged, and this charge can be positive as well as negative or both.

Figure 2:
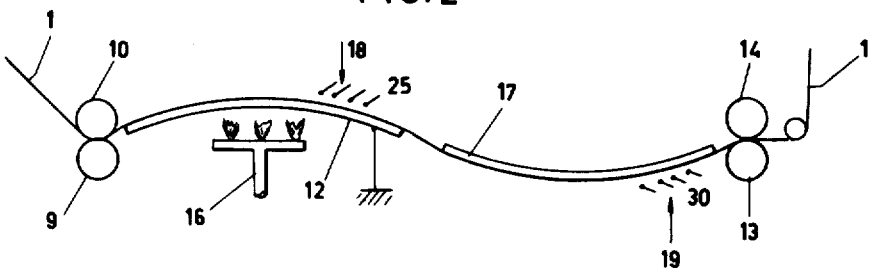
FIG. 2 shows an improved second stage for stretching a film with which the film can be provided with an injected charge on both surfaces.

So as to manufacture a film that is as highly positively as negatively charged, charging must be implemented on both sides. FIG. 2 shows an embodiment, with which this is possible.

A second curved plate 17, which has been mounted between pairs of rollers 9/10 and 13/14, by means of an additional charging device 19, enables the injection of positive charges on the surface of film 1 that has not yet been sprayed upon.

On the contrary, so as to filter aerosol particles that [have been] *are* charged unipolarly, it is preferable to apply [unipolarly] *unipolar* charges of opposite polarity to the fibre. Even for bipolarly charged aerosols the filter mat can be composed of alternatively positively and negatively charged fibre layers. The unipolar charging can also be implemented by the two-stage charging of FIG. 2. Preferably, then the potential of plate 17 is chosen the same as that of spraying wires 25 and at spraying wires 30 a voltage is applied that is sufficiently [negative] *of greater magnitude* with respect to plate 17.

Figure 3:
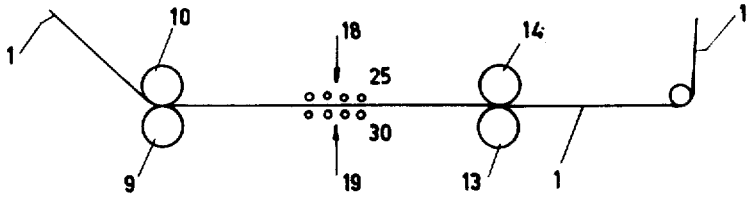
FIG. 3 shows a preferential construction of a process stage [charging for improved and higher of the film.] *for improved and higher charging of the film.*

FIG. 3 shows a preferential embodiment of a charging step with corona elements 18, 19 on each side of the film carrying equal but opposite potentials. This charging step 18, 19 can follow a stretching step that is already known in the art. If, however, charging step 18, 19 coincides with the stretching step, then charging preferably is implemented in a furnace that is not shown.

Figure 4:
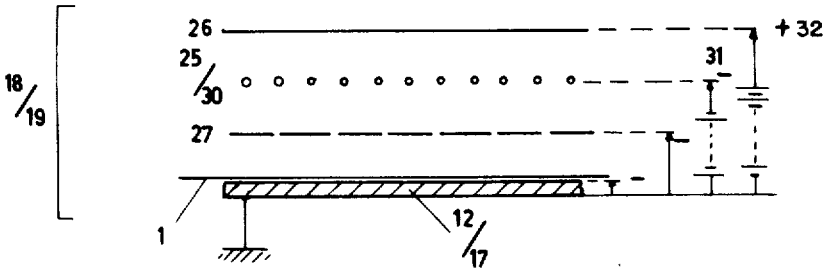
FIG. 4 shows on an enlarged scale an example of a set-up of electrodes for injecting charge into the film.

FIG. 4 shows one of the applied charging devices 18 and 19 on an enlarged scale. Between spraying wires 25/30 and curved plates 12/17 over which film 1 is guided, there is a metal grid 27 so as to better distribute the charge that is injected by the thin corona wires. The charge the film acquires is determined by the potential of the grid. In case of a slow throughput rate the film is roughly charged up to the potential of the grid. An additional advantage of the device used is that the risk of dielectric breakdown of the film and also of a spark discharge to the bare parts of plates 12/17 is very small, because the grid screens the corona wires from the film. Due to this grid, it is also possible to feed the small corona wires with an alternating current instead of with a direct current, if so desired.

Metal plate 26 over spraying wires 25/30 is interconnected with grounded plates 12/17. Because plate 26 increases the corona formation considerably, the spraying intensity with an upper plate is substantially higher than in an arrangement without it.

In a simplified construction of the charging device, which gives a somewhat less uniform charging, the grid is left out. In that case plate 26, preferably, must be connected via terminal 32 to a positive voltage with respect to plate 12/17. For in case of a positive voltge on plate 26 there need not be applied a large negative corona voltage on the small corona wires. In fact the corona voltage can be halved, if the potential is chosen equal (but opposite) to that of the cornoa wires. This, too, reduces the risk of dielectric breakdown in the film considerably, particularly when the film is very thin.

EXAMPLE I

A film of isotactic polypropylene with a thickness of 45μ and a width of 5 cm was stretched to a ratio of 1:6 over block 8 the temperature of which was 110° C. In a second stage stretching and charging was implemented over plate 12 of a temperature of 130° C., at a stretching ratio of 1:1.5. The transport velocity was 12.2 m/min. In spraying device 18 placed over plate 12 corona wires 25 had been connected to −3.2 KV and top plate 26 to +3 KV. The distance from corona wires 25 to plate 12 amounted to 5 mm. The film was fibrillated with a needle roller of 60 rows, the needles of which stood 500μ apart. The charged fibrillate was spread to approx. 45 cm and wound up on roller 24 into a filter with a thickness of 3 mm.

The collection efficiency of this filter and an equivalent uncharged filter was tested with a heterodisperse NaCl aerosol at a linear air velocity of 10 cm/sec and an aerosol concentration of 15 mg-NaCl/m$^3$. For comparison also a commercial filter made from glass fibres from 1 to 10μ was tested.

| | filter weight gram/m$^2$ | initial penetration % | pressure loss mm $H_2O$ |
|---|---|---|---|
| charged filter | 163 | 0,5 | 1.5 |
| non-charged filter | 163 | 53 | 2.8 |
| filter with glass fibers | 167 | 21 | 5.0 |

EXAMPLE II

The method of Example I was repeated, but the charging was now done with the spraying device of FIG. 3, with the voltage on the corona wires amounting to −10 KV and that on the grid to −2.3 KV. The processing into a filter was equal to that of the above mentioned example.

| | filter weight gram/m$^2$ | initial penetration % | pressure loss mm $H_2O$ |
|---|---|---|---|
| charged filter | 163 | 0.3 | 1.1 |
| non-charged filter | 163 | 53 | 2.8 |

I claim:

1. A method for the manufacture of an electrically charged fibrous filter from a high molecular non-polar material, comprising the steps of:

continuously feeding a film of high molecular isotactic polypropylene material at a rate of 12.2 meters per minute;

stretching said film in two stages, said first stage of stretching stretches said film at a ratio of 1:6 at a temperature of approximately 110° C., said second stage of stretching stretches said film at a ratio of 1:1.5 at a temperature of substantially 130° C.;

homopolarly charging at least one side of the stretched film with a plurality of corona charging elements, said plurality of corona discharge elements being connected to minus 10 KV, said step of charging including the use of a metal plate connected to an opposite polarity voltage source and a grid whereby said charging corona elements are between said metal plate and said film, said metal plate being connected to a voltage of plus 3 KV, said grid being connected to a voltage of minus 2.3 KV, said corona charging elements being spaced substantially 5 mm from the means for supporting said film during said second stage of stretching;

fibrillating the charged film into fiber material; *and* collecting the fiber material [; and processing the collected fiber material into a filter] *to form a filter.*

2. A method for the manufacture of an electrically charged fibrous filter from a high molecular non-polar material, comprising the steps of:

continuously feeding a film of high molecular isotactic polypropylene material at a rate of 12.2 meters per minute;

stretching said film in two stages, said first stage of stretching stretches said film at a ratio of 1:6 at a temperature of approximately 110° C., said second stage of stretching stretches said film at a ratio of 1:1.5 at a temperature of substantially 130° C.;

homopolarly charging at least one side of the stretched film with a plurality of corona charging elements, said plurality of corona discharge elements being connected to minus 3.2 KV, said step of charging including the use of a metal plate connected to an opposite polarity voltage source whereby said charging corona elements are between said metal plate and said film and said metal plate being connected to a voltage of plus 3 KV, said corona charging elements being spaced substantially 5 mm from the means for supporting said film during said second stage of stretching;

fibrillating the charged film into fiber material; *and* collecting the fiber material [; and processing the collected fiber material into a filter] *to form a filter.*

3. A method as in claim 2 wherein said step of homopolarly charging said film takes place simultaneously with said second stage of stretching.

4. A method as in claim 2 wherein said step of homopolarly charging takes place simultaneously with the second stage of stretching at the region of highest heat application on said moving film.

5. A method as in claim 2 wherein said film is bi-laterally charged by a plurality of coronoa elements on each side of said film.

6. A method as in claim 2 wherein said step of homopolarly charging includes the step of using a grid connected to the same polarity voltage source as said plurality of charging corona elements such that said grid is between said charging corona elements and said film.

7. A method as in claim 5 wherein said step of stretching is accomplished in two stages and said step of homopolarly charging said film takes place simultaneously with said second stage of stretching.

8. A method as in claim 7 wherein said step of homopolarly charging takes place simultaneously with the second stage of stretching at the region of highest heat application on said moving film.

9. A method as in claim 6 wherein said film is bi-laterally charged by a plurality of corona elements on each side of said film.

*10. A method for the manufacture of an electrically charged fibrous filter from a highly molecular non-polar material, comprising the steps of:*

*continuously feeding a film of said material;*

*heating said film*

*stretching said film along the longitudinal axis thereof as defined by the path of movement of said film;*

*homopolarly electrically charging at least one side of said film;*

*fibrillating the charged film into fiber material; and*

*collecting the fiber material to form a filter.*

*11. A method as in claim 10 wherein said film is stretched substantially nine times the original length thereof.*

*12. A method as in claim 10 wherein said step of stretching includes the step of heating said film wherein the temperature is slightly below the melting temperature of said film.*

*13. A method as in claim 10 wherein said step of stretching includes the step of heating said film and the temperature is dependent on the speed at which the film is continuously fed, said temperature increasing with increasing speed of film feeding.*

*14. The method as in claim 10 wherein said step of stretching includes the step of stretching said film in two stages wherein both stages of stretching include the application of heat to said film and wherein the temperature in both stages is slightly lower than the melting temperature of said film.*

*15. A method as in claim 10 wherein said step of stretching includes the step of stretching said film in two stages wherein both stages of stretching include the application of heat to said film and wherein the temperature of the second stage of stretching is greater than the temperature of the first stage of stretching.*

*16. A method for the manufacture of an electrically charged fibrous filter from a highly molecular non-polar material, comprising the steps of:*

*continuously feeding a film of said material;*

*heating said film*

*stretching said film;*

*homopolarly electrically charging at least one side of said film;*

*fibrillating the charged film into fiber material substantially in the longitudinal direction thereof as defined by the path of feeding of the film; and*

*collecting the fiber material to form a filter.*

*17. A method as in claim 16 wherein said step of fibrillating employs a needle roller having a higher peripheral velocity than the speed of feeding of said film.*

*18. A method as in claim 16 wherein said step of fibrillating includes spreading the film fibers, which spreading is enhanced by the electrostatic charges injected during said step of charging.*

*19. A method for the manufacture of an electrically charged fibrous filter from a highly molecular non-polar material, comprising the steps of:*

*continuously feeding a film of said material;*

*heating said film;*

*stretching said film;*

*homopolarly electrically charging at least one side of said film;*

*fibrillating the charged film into fiber material; and*

*collecting the fiber material on a roller and simultaneously taking one or more layers lying on top of the other together from said roller to form a filter.*

*20. A method for the manufacture of an electrically charged fibrous filter from a highly molecular non-polar material, comprising the steps of:*

*continuously feeding a film of said material;*

*heating said film;*

*stretching said film;*

*homopolarly electrically charging at least one surface of said film using a corona device spaced from the surface of said film whereby the electric charge is sprayed onto the surface of said film;*

*fibrillating the charged material into fiber material; and*

*collecting the fiber material to form a filter.*

*21. The method as in claim 20 wherein said step of charging coincides with said step of stretching.*

*22. A method as in claim 21 wherein said step of charging includes the steps of inserting a metal grid between said corona device and the surface of said film, and supporting said film on a grounded support member.*

*23. A method as in claim 22 wherein said step of charging includes the step of applying an alternating voltage to the corona wires of said corona device.*

*24. A method as in claim 22 wherein said step of charging increases the spraying intensity of the charge onto the surface of the film by positioning a metal plate a greater distance from the film surface than said corona device.*

*25. A method as in claim 20 wherein said step of homopolarly charging at least one side of said film includes charging both surfaces of said film by respective corona devices spaced from the respective surfaces of said film.*

*26. A method as in claim 25 wherein the step of charging the film surface includes the step of applying equal but opposite charging to the respective opposite surfaces of said film.*

*27. A method as in claim 20 wherein said step of charging includes ageing the film thermally to obtain high charge persistence and also to increase the thermal stability of the charge of said film.*

*28. A method as in claim 20 wherein said step of charging includes a first step of charging one surface of the film with one charge polarity coincidentally with said step of stretching by a corona device spaced from said film surface, and a second subsequent step of charging the other film surface with a charge of opposite polarity by a second corona device spaced from said other film surface.*

*29. A method as in claim 21 wherein said step of stretching includes the application of heat to said film and said step of charging includes positioning said at least one corona device in a region of the highest temperature applied during said step of stretching.*

*30. A method for the manufacture of an electrically charged fibrous filter from a highly molecular non-polar material, comprising the steps of:*

*continuously feeding a film of said material;*

*stretching said film in two stages along the longitudinal axis thereof as defined by the path of movement of said film, and including the step of applying heat to both said two stages;*

*homopolarly charging said film in said second stage;*

*fibrillating the charged film into fiber material substantially along said longitudinal axis; and*

*collecting the fiber material to form a filter.*

*31. A method as in claim 30 wherein said step of fibrillating employs a needle roller having a higher peripheral velocity than the speed of feeding said film.*

*32. A method as in claim 30 wherein said fiber material is collected on a roller, said step of collecting including the step of taking one or more layers lying on top of one another together simultaneously from said roller.*

*33. A method as in claim 30 wherein the temperature in each of said two stages is dependent upon the speed at which said film is continuously fed, said temperature increasing with increasing speed of film feeding and extending to a temperature slightly lower than the melting temperature of said film.*

*34. A method as in claim 33 wherein said step of homopolarly charging said film includes the step of spraying electrical charge onto at least one film surface by corona effect and at least one grounded film support member.*

*35. A method as in claim 34 wherein said step of spraying includes placing at least one corona effect device in spaced relationship to said at least one film surface and positioning a metal grid between said at least one corona effect device and said at least one grounded film support member.*

*36. A method as in claim 35 wherein said step of spraying includes applying an alternating voltage to the corona wires of said corona effect device.*

*37. A method as in claim 35 wherein the step of spraying increases the spraying intensity of the charge by positioning a metal plate a greater distance from the film surface than said corona effect device.*

*38. A method as in claim 34 wherein said step of spraying is implemented where the temperature of the film is the highest.*

*39. A method as in claim 38 wherein said film is stretched in stretching ratios of 1:4 and 1:1.5 in said first and second stage, respectively.*

*40. A method as in claim 34 wherein said step of spraying is applied at the initial portion of said second stage.*

*41. A method as in claim 34 wherein said film is homopolarly charged in two stages wherein the first charging stage corresponds to the second stretching stage and including spraying electrical charges onto said one surface in the first charging stage and spraying electrical charges onto the other film surface by a corona effect with a second film support member in the second stage of charging.*

*42. A method as in claim 41 wherein the electrical charges sprayed onto the respective film surfaces are of opposite polarity.*

*43. A method as in claim 41 wherein charges sprayed onto each of the film surfaces are of the same polarity and the potential applied to said second support member is the same as the potential for spraying electrical charges in the first charging stage and the magnitude of the potential for*

*spraying in the second charging stage is greater than the potential of said second support member.*

*44. A method for the manufacture of an electrically charged fibrous filter from a highly molecular non-polar material, comprising the steps of:*

*continuously feeding a film of said material;*

*stretching said film along the longitudinal axis thereof as defined by the path of movement of said film and including the step of applying heat to said film;*

*homopolarly charging the stretched film on both surfaces thereof by spraying one surface with a charge of one polarity and spraying the other surface of said film with an equal charge of the opposite polarity;*

*fibrillating the charged film into fiber material substantially along said longitudinal axis; and*

*collecting the fiber material to form a filter.*

*45. A method as in claim 41 wherein said step of homopolarly charging is coincidental with said step of stretching.*

*46. A method as in claim 44 wherein each film surface is sprayed by placing a respective corona effect device in spaced relationship to a respective film surface and positioning a metal grid between each of said corona effect devices and the respective film surface.*

*47. A method as in claim 46 wherein the step of spraying increases the spraying intensity of the charge by positioning a metal plate a greater distance from the film surface than said corona effect device.*

*48. A method as in claim 46 wherein said step of spraying includes applying an alternating voltage to the corona wires of each of the cornoa effect devices.*

* * * * *